D. A. BEYER.
FOOTBOARD BRACE FOR VEHICLES.
APPLICATION FILED MAR. 19, 1917.
1,298,160.
Patented Mar. 25, 1919.
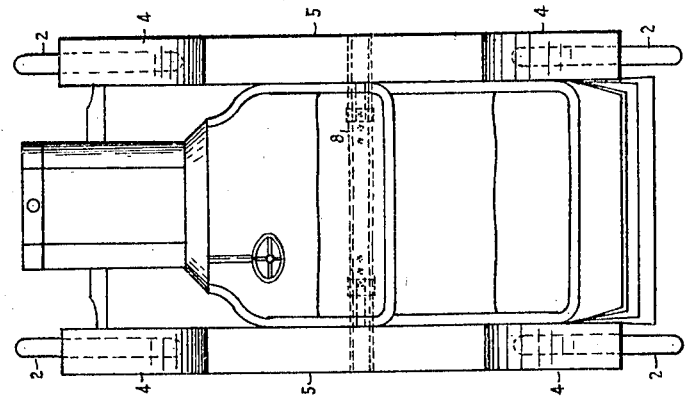
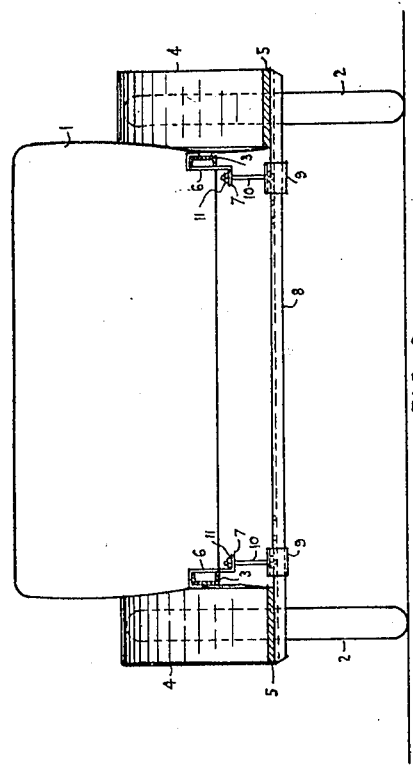
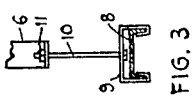
INVENTOR.
Daniel A. Beyer
BY
ATTORNEYS.

UNITED STATES PATENT OFFICE.

DANIEL A. BEYER, OF HOUSTON, TEXAS, ASSIGNOR OF ONE-HALF TO A. M. CHAMBERS, OF HARRIS COUNTY, TEXAS.

FOOTBOARD-BRACE FOR VEHICLES.

1,298,160.  Specification of Letters Patent.  Patented Mar. 25, 1919.

Application filed March 19, 1917. Serial No. 155,874.

*To all whom it may concern:*

Be it known that I, DANIEL A. BEYER, a citizen of the United States, residing at Houston, in the county of Harris and State of Texas, have invented certain new and useful Improvements in Footboard-Braces for Vehicles, of which the following is a specification.

This invention relates to new and useful improvements in a foot board brace for vehicles, and is more particularly adapted for use in bracing the foot boards of automobiles.

The object of the invention is to provide a brace of the character described adapted to be supported from the vehicle frame and which rests closely against the foot boards underneath and braces the same against saggings.

Another object of the invention resides in the provision of the brace of the character described which is adjustable so that it may be applied to a vehicle of any width.

A further feature of the invention resides in the provision of the device of the character described which is simple and inexpensive of construction and which may be easily applied to, and readily removed from an automobile.

With the above and other objects in view, the invention has particular relation to certain novel features of construction, arrangement of parts and use, an example of which is given in this specification and illustrated in the accompanying drawings, wherein:—

Figure 1 is a plan view of an automobile showing the brace applied thereto.

Fig. 2 is a transverse sectional view thereof, and

Fig. 3 is a transverse sectional view of the brace, showing the means of suspending the same from the hanger.

Referring now more particularly to the drawings wherein like numerals of reference designate similar parts in each of the figures, the numeral 1 refers to an automobile body which is mounted upon the carrier wheels 2 through the medium of a frame, said frame including the side members 3, 3, which may be formed of channel iron, as shown. The numerals 4 indicate the wheel fenders and between these fenders on each side are the foot boards 5, 5, said fenders and foot boards being of any well known construction. A hanger 6 is provided on each side of the frame, said hangers being formed into hooks which engage over the corresponding side members 3, 3, and which have their lower free ends outwardly turned, as at 7. A brace 8 is provided, formed preferably of a channel iron, placed in inverted position and whose ends rest closely against the foot boards underneath to form supports therefor. Anchors 9, 9, are provided which are inverted U-shaped members, as shown in Fig. 2, slidably mounted on the brace 8 the free ends of whose arms are formed into hooks which engage over the flanges of said brace to hold said anchors against detachment from the brace. Tie rods 10, 10 are provided which pass through alined orifices in the respective anchors and the corresponding outwardly turned ends of the hangers 6, the heads of said bolts engaging against said anchors and the free ends thereof being outwardly threaded to receive the nuts 11, 11, these tie bolts supporting the brace 8 from the hangers. By tightening said nuts 11 the ends of the brace 8 may be drawn up closely against the foot boards 5, 5, to form supports therefor.

The anchors 9 are adjustable so as to adapt the device for use on automobiles of different widths. In applying the brace, the hangers are first attached to the side members 3, 3. The tie bolts then are inserted through the anchors 9 and said anchors are adjusted on the brace to the desired position. The free ends of the tie bolts are then inserted through the outwardly turned ends 7 of the hangers and the nuts 11 screwed thereon and tightened until the brace is drawn firmly against the underside of the foot board.

If desired, the anchors may be dispensed with and the brace be provided with a plurality of orifices, as 12, on each side to receive the tie rods 10, said orifices being spaced apart to accommodate the brace to cars of different widths.

What I claim is:

The combination with a vehicle having a frame and side foot boards, of a rigid transverse brace whose ends rest underneath the corresponding foot boards, said brace being formed of inverted channel iron, a hanger attached to each side member of the frame, said hangers being formed into hooks which engage over, and are detachably secured to the respective side members, the lower ends of said hangers being turned outwardly and provided with orifices, oblong anchors formed of inverted U-shaped members slidably mounted on said brace, the free ends of whose arms are formed into hooks which form long bearings and engage over the flanges of said brace to hold the anchors against detachment therefrom and to permit said members to slide on said brace, tie rods secured to the respective anchors at one end and whose other ends project through the orifices of said hangers and are outwardly threaded and nuts screwed upon said threaded ends to secure said tie rods against detachment from the hangers, and to permit the adjustment of the brace relative to the foot boards.

In testimony whereof I have signed my name to this specification in the presence of two subscribing witnesses.

DANIEL A. BEYER.

Witnesses:
Dr. J. E. KEIGHTLEY,
J. M. BOBO.

Copies of this patent may be obtained for five cents each, by addressing the "Commissioner of Patents, Washington, D. C."